(12) United States Patent
Borst et al.

(10) Patent No.: US 7,728,239 B2
(45) Date of Patent: Jun. 1, 2010

(54) BUCKLE SWITCHING DEVICE FOR SAFETY BELTS

(75) Inventors: Peter Borst, Unlingen (DE); Dietmar Barth, Reutlingen (DE)

(73) Assignee: Rolf Prettl, Tuebingen (DE)

( * ) Notice: Subject to any disclaimer, the term of this patent is extended or adjusted under 35 U.S.C. 154(b) by 107 days.

(21) Appl. No.: 11/874,173

(22) Filed: Oct. 17, 2007

(65) Prior Publication Data

US 2008/0093205 A1 Apr. 24, 2008

(30) Foreign Application Priority Data

Oct. 18, 2006 (DE) .................. 10 2006 050 239

(51) Int. Cl.
*H01H 3/16* (2006.01)
(52) U.S. Cl. ................... 200/61.58 B; 200/61.578 R
(58) Field of Classification Search .......... 200/61.58 R, 200/61.58 B
See application file for complete search history.

(56) References Cited

U.S. PATENT DOCUMENTS

| | | | | |
|---|---|---|---|---|
| 4,001,532 A | * | 1/1977 | Kubota et al. | 200/61.58 B |
| 4,015,094 A | * | 3/1977 | Gavagan et al. | 200/61.58 B |
| 4,754,105 A | * | 6/1988 | Doty et al. | 200/61.58 B |
| 4,920,620 A | * | 5/1990 | Yamamoto et al. | 24/641 |
| 5,970,587 A | | 10/1999 | Knox | |
| 6,002,325 A | | 12/1999 | Conaway | |
| 7,084,362 B2 | | 8/2006 | Ebert | |
| 2004/0140890 A1 | * | 7/2004 | Hartmann et al. | 340/457.1 |

FOREIGN PATENT DOCUMENTS

| | | |
|---|---|---|
| DE | 295 10 590 U1 | 12/1996 |
| DE | 199 07 716 A1 | 8/2000 |
| DE | 202 04 318 U1 | 9/2002 |
| DE | 10 2005 041 029 A1 | 3/2007 |
| EP | 1 577 178 A1 | 9/2005 |
| WO | WO 2007/022872 A1 | 1/2007 |

OTHER PUBLICATIONS

English Abstract, DE19907716, wpindex copyright 2007, The Thomson Corp, in 1 page.
English Abstract, DE29510590, wpindex copyright 2007, The Thomson Corp, in 1 page.
English Abstract, DE102004011299, wpindex copyright 2007, The Thomson Corp, in 1 page.

* cited by examiner

*Primary Examiner*—Renee S Luebke
*Assistant Examiner*—Lisa Klaus
(74) *Attorney, Agent, or Firm*—Knobbe, Martens, Olson & Bear LLP

(57) ABSTRACT

Buckle switching device for a buckle for safety belts for the purpose of electrically detecting whether a belt tongue is locked in the buckle, where the buckle switching device is at least partly enveloped by a housing, and the buckle switching device has a conductor arrangement and a first detection device which can be influenced by means of the belt tongue for electrically detecting whether the belt tongue is locked, where the conductor arrangement has first contact regions for an electrical connection to the first detection device and second contact regions for an electrical connection to a second detection device which can be influenced by means of the belt tongue.

16 Claims, 5 Drawing Sheets

BUCKLE SWITCHING DEVICE FOR SAFETY BELTS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

The present invention relates to a buckle switching device for a buckle (also called safety belt lock) for safety belts for the purpose of electrically detecting whether a belt tongue is locked in the buckle, where the buckle switching device is at least partly enveloped by a housing, and the buckle switching device has a conductor arrangement and a first detection device which can be influenced by means of the belt tongue for the purpose of electrically detecting whether the belt tongue is locked.

Buckles are known generally and are used particularly in motor vehicles. In most countries, there is an obligation to fasten one's seatbelt in motor vehicles, and many vehicle manufacturers wish to remind at least the driver of whether or not he has put on his safety belt.

A detection device or a sensor means detects whether the belt tongue is locked, that is to say whether the safety belt has been put on. A signal which is output by the detection device can be used in the superordinate control device to drive suitable indicators (audible and/or visual).

In known buckles, for example in line with DE 199 07 716 A1 mentioned at the outset, a Hall sensor with a Hall detector and a permanent magnet is used to identify whether the belt tongue has been inserted into the buckle.

DE 202 04 318 U1 reveals a switch for a buckle for restraining systems in motor vehicles in order to indicate whether the belt tongue is inserted into the buckle and is properly locked. The detection device has a fixed-contact plate and a contact spring, with a slider operated by a belt tongue pressing the contact spring against the fixed-contact plate.

Finally, DE 295 10 590 U1 discloses a fastener for safety belts in vehicles in which a switch can be inserted through an opening on the reverse of the buckle's enclosure, which is remote from the belt insertion rail.

It is an object of the present invention to provide a buckle switching device which provides increased flexibility for the use of various detection devices.

BRIEF SUMMARY OF THE INVENTION

According to one aspect of the invention there is provided a buckle switching device for a buckle for safety belts for the purpose of electrically detecting whether a belt tongue is locked in the buckle, where the buckle switching device is at least partly enveloped by a housing, and the buckle switching device has a conductor arrangement and a first detection device which can be influenced by means of the belt tongue for electrically detecting whether the belt tongue is locked, wherein the conductor arrangement has first contact regions for an electrical connection to the first detection device and second contact regions for an electrical connection to a second detection device which can be influenced by means of the belt tongue.

The prior art merely discloses the practice of equipping a buckle switching device with a single, hard-wired detection device. In contrast to that, the inventive buckle switching device with its contact regions allows optionally the first contact regions or the second contact regions or first and second contact regions to be fitted with a detection device. This means that it is a particularly simple matter to produce different variants of buckle switching devices in the manufacturing process.

It is also possible, particularly if the contact regions are in the form of contact areas, to use different types of detection devices (electrical, inductive, capacitive etc.). Depending on the production series, it is then possible to decide upon the detection device or the detection devices with which the buckle switching device is to be fitted.

In addition, the inventive buckle switching device can provide improved safety. This is one aspect which has not been taken into account in the prior art to date. The possibility of fitting the buckle switching device with two detection devices allows the failsafety of the buckle switching device to be improved.

Preferably, the second detection device is built-in, i.e. is in electrical connection with the second contact regions.

A buckle switching device of this kind accordingly has two detection devices which can be influenced by means of a belt tongue. The second detection device may involve the same operating principle (electrical, inductive, capacitive etc.) as the first detection device. However, it is particularly advantageous if the second detection device involves a different operating principle, since it is therefore possible to ascertain the position of the belt tongue using two different methods. In addition, two detection devices allow the position of the belt tongue to be detected with reference to two different locations.

In line with one preferred embodiment, the first detection device is connected in parallel with the second detection device.

To this end, contact regions with different potentials or potential profiles are respectively designed to be electrically isolated from one another. Contact regions at the same potential, particular at an earth potential, may be electrically connected.

This design allows the output signals from the detection devices to be requested and/or evaluated separately, which means that it is possible to implement further functions. Thus, by way of example, a comparator can be used to ascertain whether both detection devices have identified the belt tongue, and a "belt tongue inserted" signal is output only when both detection devices have identified the belt tongue. Secondly, this allows one detection device to be used to actuate an indicator lamp in the dashboard, for example, and allows the other detection device to be used to send a signal to the airbag's controller. This means that safety and functionality can be increased.

In line with another preferred embodiment, the first detection device is connected in series with the second detection device.

This allows the failsafety of the buckle switching device to be increased. In particular, the signal that the belt tongue is correctly inserted is produced only when the correct position has been indicated by both detection devices. To this end, the detection devices can be produced as make contacts and can have a test signal applied to them. The detection devices respectively make contact only when they have detected the correct position of the belt tongue. If the detection devices are connected in series, this means that the test signal is forwarded by the detection devices only when both detection devices complete a current path, i.e. when both detection devices have detected the correct position of the belt tongue.

In line with another preferred embodiment, one of the detection devices has an electrically conductive snap-action disc which can be moved by a mechanical operating device from a first to a second actuation position, which closes or opens an electrical contact.

Snap-action discs have been known for a long time. Besides use as a "clicker frog", they are today used in keyboards for computers, for example. Snap-action discs are usually made from a high-grade spring steel which is gold-plated completely or at a suitable location or is contact-finished in another way.

Generally, however, a snap-action disc can also be made from plastic and coated or otherwise provided with an electrically conductive material so that conductivity and the ability to close and open an electrical contact are provided.

In addition, snap-action discs are very inexpensive components, at least as a large-scale production component, as is regularly the case when used in motor vehicles.

In addition, with today's production methods and materials, it is possible to ensure that the "snap-action property" of the snap-action discs is maintained largely unchanged over a long life time.

Furthermore, the use of a snap-action disc has the advantage that the spring elasticity of the component can be exploited for making contact by virtue of the snap-action disc being pressed against electrical contacts on account of its spring force.

It is particularly advantageous if the snap-action disc has a first contact section, which is in contact with a first electrical contact both in the first and in the second actuation position, and a second contact section, which is spaced apart from a second electrical contact in a first actuation position and which is in contact with the second electrical contact in the second actuation position.

Although it is generally conceivable for a snap-action disc also to be produced with just a single contact section which is pulled to earth, for example, it is preferable to produce two contact sections, since in this case it is possible for an electrical current to flow via the snap-action disc. This results in a simpler electrical circuit for the buckle switching device.

In line with another preferred embodiment, the mechanical operating device transmits a force exerted on the belt tongue when the belt tongue is inserted to the snap-action disc.

This allows the effect of pushing in the belt tongue to be transmitted to the snap-action disc particularly easily. Generally, however, it is also possible to arrange the snap-action disc such that it is operated by the belt tongue directly (with an insulating and/or elastic component being able to be arranged in between if appropriate).

It is particularly advantageous if the snap-action disc has a third contact section which is in contact with a third electrical contact in a first actuation position and which is spaced apart from the third electrical contact in the second actuation position.

In this embodiment, the snap-action disc forms a kind of "changeover switch", since the first electrical contact is electrically connected either to the second electrical contact or to the third electrical contact, but never to both the second and the third electrical contact. In this case, it is particularly preferred to use the changeover switch's break contact to actuate an indicator lamp in the dashboard directly and to use the changeover switch's make contact to actuate what is known as a belt-wear comfort coil directly.

Generally, the snap-action disc may be in the form of a tongue-like component (as in the case of a "clicker frog").

With another preferred embodiment, the mechanical operating device has an operating element in the form of an eccentric element which can be rotated about a rotation axis by means of a force exerted by the belt tongue and has an eccentric section which acts on the snap-action disc.

An eccentric element allows a transmission of force from the belt tongue to the snap-action disc in a manner which is simple in terms of design and nevertheless exhibits a high level of mechanical strength.

It is also advantageous if the mechanical operating device has a rotation shaft which is mounted on the housing so as to be able to rotate about a rotation axis and is connected to a lever which extends into an opening for inserting the belt tongue.

The lever is pivoted about the rotation axis when the belt tongue is inserted. The rotation shaft is rotated and its rotation can be reoriented into a movement for operating the snap-action disc, for example by means of an eccentric section.

Generally, however, the rotation shaft may also have a second lever for operating the snap-action disc provided on it or another suitable gear unit in the form of a rotation/translation transducer.

It is also advantageous if the mechanical operating device has a rotation shaft which is mounted on a housing so as to be able to rotate about a rotation axis and is connected to an elastic restoring element which elastically prestresses the rotation shaft into the first actuation position.

The elastic restoring element may be formed by an elastomer component. Preferably, however, it is formed by a spring component. By way of example, this can act upon a lever which extends into the opening for introducing the belt tongue.

However, it is particularly advantageous if the elastic restoring element is formed by a spring which is mounted on the housing and acts upon a lever which is connected to the rotation shaft so as to rotate with it.

In this embodiment, the spring can first of all be assembled easily. Secondly, both the lever and the spring can be accommodated in the housing, so that the overall result is a space-saving device.

In one advantageous refinement of the invention, which is an inventive development of the prior art even on its own and without the features regarding the first and second contact regions, a lamp element is electrically connected to the conductor arrangement.

This makes it a simple matter to integrate lighting into the buckle switching device or into the buckle without the need for separate cables for supplying electricity to the lamp element.

In another advantageous refinement of the invention, the lamp element has an associated light guide in order to pick up at least some of the light emitted by the lamp element and to guide it to a desired location.

The light guide allows a high level of flexibility for the arrangement of the lamp element. Thus, the lamp element does not need to be arranged precisely at the point at which the lighting is needed. Rather, the lamp element can be arranged at a point at which it is beneficial in terms of design and/or production, while the emitted light is guided to the desired location by means of the light guide.

In another advantageous embodiment of the invention, the light guide is in a form such that the light is guided to a button which is designed to unlock the buckle.

This means that it is a simple matter to find the unlocking button and/or the opening for inserting the belt tongue even in the dark.

In addition, the following advantages will also be pointed out:

It is advantageous if the snap-action disc has a central section and a plurality of legs which extend from the central section, the legs forming a first contact section and the central section forming a second contact section.

This embodiment allows the snap-action disc to be kept stably in the housing by means of a simple design and allows a stable position to be set up for the central section both in the first and in the second actuation position.

It is also advantageous in this context if at least one of the legs has an extension section which forms a third contact section.

The extension section can then be in contact with a third electrical contact in the first actuation position, for example. If the snap-action disc is operated and the central section is pressed against an electrical contact (second electrical contact), the snap-action disc's property means that the extension section is then raised from the third electrical contact. This provides a simple way of setting up the "changeover switch" property.

In line with another preferred embodiment, the mechanical operating device has a pressure plate which is mounted on the housing so as to move in the actuation direction, specifically between the snap-action disc and an operating element which transmits the belt tongue force.

This makes it possible to ensure that exclusively forces in the actuation direction are transmitted to the snap-action disc. In other words, the snap-action disc is not exposed to any transverse forces, which could impair its life.

It is also advantageous if the mechanical operating device has a pressure piece which bears directly against the snap-action disc and is manufactured from an elastically deformable material.

In this embodiment, the belt tongue force can be transmitted to the snap-action disc via the pressure piece. The elastic property of the pressure piece means that force peaks can be absorbed. It is also possible to prevent friction on the disc, which is conducive to abrasion. The disc's life can therefore be extended.

It is particularly advantageous in this context if the pressure piece is fixed on the pressure plate.

This also results in a simplified assembly in addition to the advantages cited above.

In line with another preferred embodiment, one of the detection devices has a Hall sensor.

This achieves reliable and contactless detection of the belt tongue.

In line with another preferred embodiment, at least some of the first and second contact regions are connected to conductors in a cable arrangement.

This provides a particularly simple way of routing output signals from the detection devices out of the buckle switching device.

In line with another preferred embodiment, the conductor arrangement is in the form of a punched grid (sometimes also called punched web, lead frame or pressed screen) or the conductor arrangement has a punched grid.

Punched grids as such are known per se. They have a high level of mechanical strength and are also inexpensive to manufacture, at least in large numbers. The punched grid is advantageously coated with plastic.

It goes without saying that the features cited above and the features which are yet to be explained below can be used not only in the respectively indicated combination but also in other combinations or on their own without departing from the scope of the present invention.

BRIEF DESCRIPTION OF THE SEVERAL VIEWS OF THE DRAWING

Exemplary embodiments of the invention are illustrated in the drawing and are explained in more detail in the description which follows. In the drawing.

DETAILED DESCRIPTION OF THE INVENTION

Figure 1:
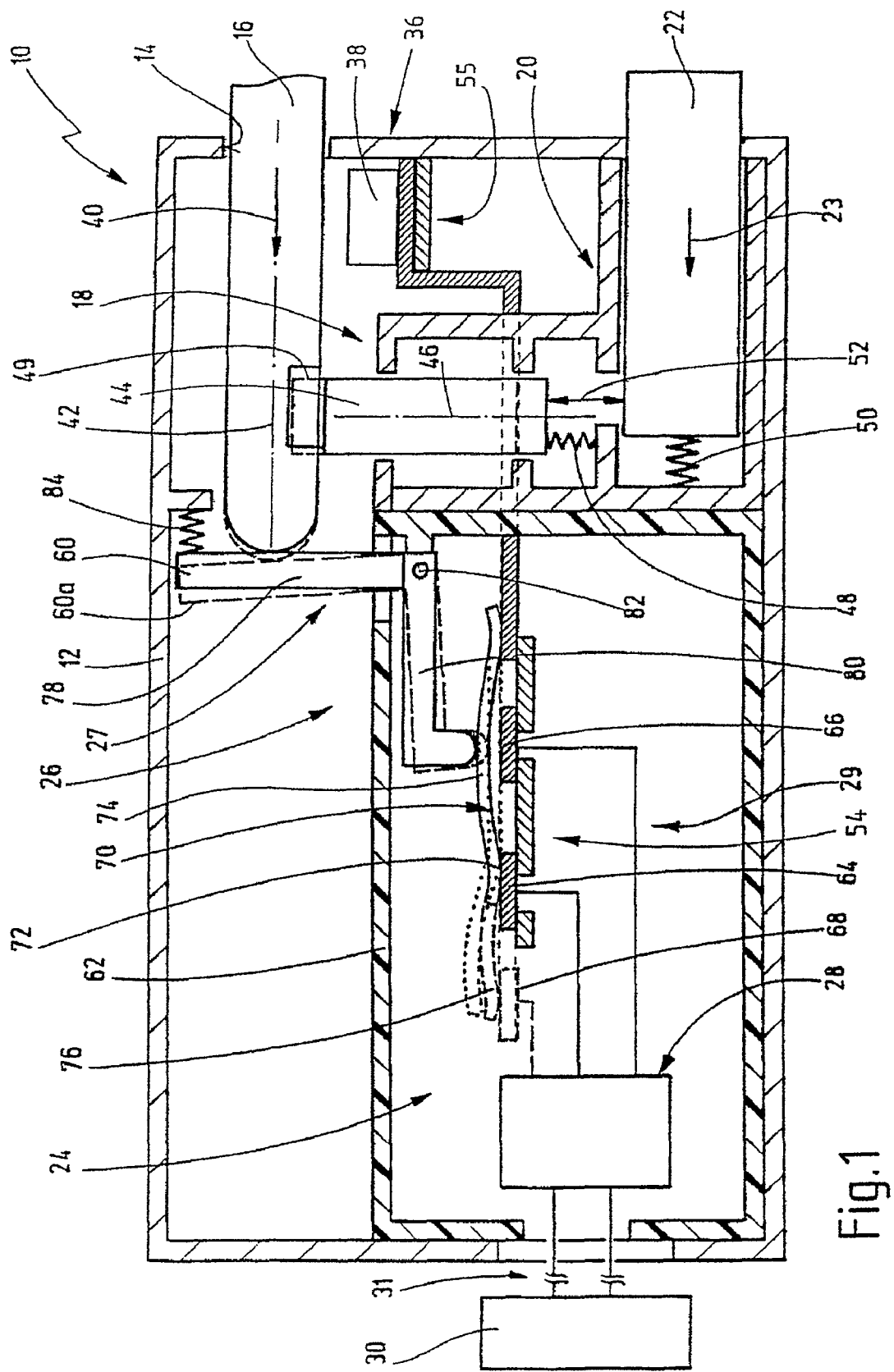
FIG. 1 shows a schematic longitudinal section through a buckle based on an embodiment of the present invention.

FIG. 1 shows a first embodiment of an inventive buckle switching device 24 in a buckle 10. The buckle switching device 24 is used for electrically detecting whether the belt tongue 16 is locked.

The buckle 10 is used as a buckle for a safety belt in a motor vehicle and has a housing 12.

The housing 12 has an opening 14 formed on it for inserting a belt tongue 16. In addition, the housing 12 contains a locking device 18 in order to lock the belt tongue 16 (to close the safety belt).

Finally, the housing 12 contains a release device 20 in order to cancel the locking of the belt tongue 16 (for the purpose of removing the safety belt). The release device 20 has a button 22 which is operated in order to release the locking of the belt tongue 16, as shown schematically at 23.

The buckle switching device 24 is enclosed by a housing 62 and has an electrical first detection device, denoted as a whole by 26. In addition, a mechanical operating device is provided, which is denoted as a whole by 27. The mechanical operating device 27 is used to transmit a force exerted on the belt tongue 16 when the belt tongue 16 is inserted to the first detection device 26, so as thereby to operate an electrical contact of the first detection device 26.

The buckle switching device 24 also has an electrical measurement circuit 28 which can be used as a diagnosis circuit, for example. A diagnosis circuit of this kind can be used to continually monitor the operation of the first detection device 26, for example by applying a test signal, for example a very small current of a few milliamps, across an electrical resistor arrangement in the measurement circuit 28. If the first detection device 26 were to switch through, this quiescent current would rise, which could then be diagnosed accordingly.

The buckle switching device 24 also has a conductor arrangement 29 in order to connect the detection device 26 to the electrical measurement circuit 28. By way of example, the conductor arrangement 29 may be an electrical printed circuit board, a flexible printed circuit board (Flex-Link) or the like, and particularly a punched grid.

The buckle switching device 24 is connected to a superordinate control device 30 by means of a cable arrangement shown schematically at 31. By way of example, the control device 30 can be used to apply the quiescent current for the electrical measurement circuit 28. Above all, however, the control device 30 is used to monitor and evaluate the actuation state of the first detection device 26. The control device 30 may be connected to an indicator device (e.g. visual and/or audible), which is not denoted in more detail, in order to indicate the locking state of the belt tongue 16 as has been detected by the buckle switching device 24.

One particular feature of the invention is that the conductor arrangement 29 has first contact regions 54, which are connected to the first detection device 26, and second contact regions 55, which are connected to a second detection device 36. For the sake of better clarity, the conductor arrangement 29 is shown only in dashes in the region of the locking device 18. The second detection device 36 is a Hall sensor 38 which detects the inserted belt tongue 16 by exploiting the Hall effect. The refinement of the conductor arrangement 29 is explained in more detail in FIGS. 2 to 4, including in connection with the first and second detection devices 26, 36.

The belt tongue 16 is introduced into the opening 14 in the housing 12 along a force and movement axis 42, as shown schematically by an arrow 40.

The locking device 18 may be formed conventionally. FIG. 1 shows the operation of such a locking device 18 merely schematically. Normally, the locking device 18 is connected to the vehicle bodywork or to the vehicle seat (which is in turn connected to the vehicle bodywork) by means of a high-strength arrangement (for example a buckle stalk or the like).

In principle, however, the locking device 18 has a bolt 44 which is mounted so as to be displaceable along a locking axis 46. The locking axis 46 is oriented transversely with respect to the force axis 42. The bolt 44 is pretensioned against the inserted belt tongue 16 by means of a spring 48. As soon as the belt tongue 16 has reached its locking position, the bolt 44 is pushed into a locking recess 49 in the belt tongue 16. This is shown schematically by dashed lines in FIG. 1.

To release the locking, the release device 20 is used. The button 22 is pretensioned against the operating direction 23 by means of a schematically illustrated spring arrangement 50.

In addition, the button 22 is coupled to the bolt 44, which is indicated schematically by a double-headed arrow 52. When the button 22 is depressed in the operating direction 23, the bolt 44 is pushed out of the recess 49 on account of the coupling 52, and the belt tongue 16 can be pulled out of the opening 14 or is ejected by at least one device which is explained below.

The mechanical operating device 27 has an operating element 60 in the form of a lever which projects into the opening 14 or into the path of the belt tongue 16.

The operating element 60 is mounted on a housing section 62 of the buckle switching device 24 so as to be able to pivot and is pivoted or deflected by the belt tongue 16 when the locking position has been reached, as shown schematically at 60'.

The first detection device 26 is in electrical contact with the first contact regions 54 or can come into contact with them. In this case, the first contact regions 54 have a first electrical contact 64, a second electrical contact 66 and optionally (shown in dashes) a third electrical contact 68. The electrical contacts 64, 66 (and possibly 68) thus form part of the conductor arrangement 29.

The first detection device 26 has a snap-action disc 70. The snap-action disc 70 is generally preformed in curved fashion and has a first contact section 72 which is constantly in contact with the first electrical contact 64.

In addition, the snap-action disc 70 has a second contact section 74 which, in an initial position, is spaced apart from the second electrical contact 66. As soon as the belt tongue 16 is in the locking position, however, the snap-action disc 70 is deflected by the mechanical operating device 27 such that the second contact section 74 touches the second electrical contact 66.

The snap-action disc 70 is manufactured from an electrically conductive material, such as a spring steel. Alternatively, the snap-action disc 70 can be manufactured from a plastic and can have at least sections coated with an electrically conductive material. When the second contact section 74 touches the second electrical contact 66, the first and second electrical contacts 64, 66 are electrically connected to one another. This state can be evaluated by the control device 30. An indicator requesting that the belt be fastened can then go out, for example.

Optionally, the snap-action disc 70 also has a third contact section 76. In the position of rest, the third contact section 76 is in contact with the optional third electrical contact 68. The first electrical contact 64 and the third electrical contact 68 are therefore connected to one another in the position of rest. This state can likewise be evaluated. By way of example, the electrical connection of the first and third electrical contacts 64, 68 can be identified as a state in which the belt tongue 16 is not yet in its locking position.

When the third contact section 76 and the third electrical contact 68 are provided, the evaluation can therefore be made redundantly. In addition, different embodiments are possible for essentially the same layout.

By way of example, a control device 30 may be designed to identify the locking state of the belt tongue 16 when the connection between the electrical contacts 64, 68 is broken.

The operating element 60 in the form of the lever arrangement has a first leg or piece 78 which projects into the opening 14 or into the path of the belt tongue 16. In addition, the operating element 60 has a second leg or piece 80 which extends inside the housing section 62 and bears on or is arranged above the top of the snap-action disc 70. The operating element 60 is mounted so as to be able to rotate about a rotation axis 82, specifically on the housing section 62. The rotation axis 82 runs transversely with respect to the force axis 42.

In FIG. 1, dashed lines show the state in which the belt tongue 16 has reached the locking position. The operating element 60 has accordingly been deflected and the second piece 80 has pushed down the snap-action disc 70 (shown in dots), so that the second contact section 74 has come into contact with the second electrical contact 66. At the same time, the third contact section 76 (if provided as an option) has been released from the third electrical contact 68.

This alteration in the state of the first detection device 26 can be evaluated by the control device 30 and indicated by changing appropriate indicators.

At 84, an elastic restoring element is shown which pulls the operating element 60 back into the initial position if the belt tongue 16 has been pulled out of the buckle 10. On account of the spring-elastic property of the snap-action disc 70, the latter "snaps" back into the position of rest shown by solid lines in FIG. 1, in which the second electrical contact 66 and the second contact section 74 are electrically isolated from one another.

Figure 2:
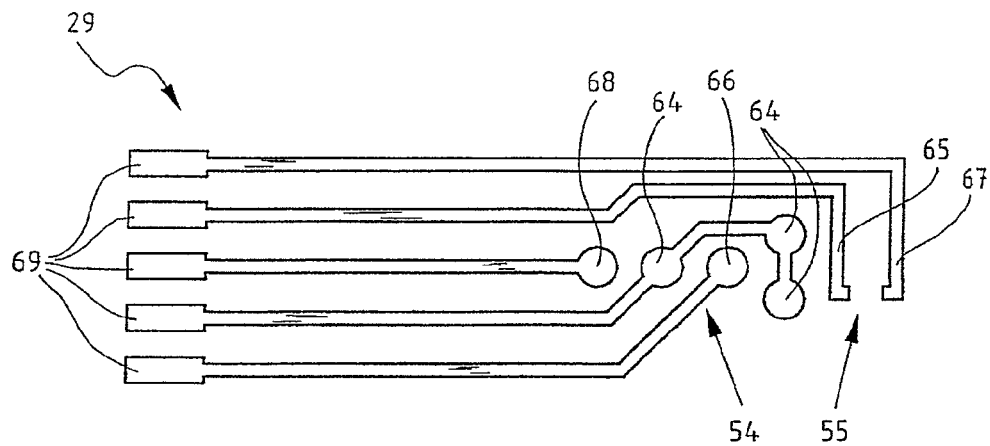
FIG. 2 shows a conductor arrangement according to the invention, in the form of a punched grid, with first and second contact regions.

FIG. 2 shows an exemplary embodiment of a conductor arrangement 29 which is in the form of a punched grid. In this case, the first contact regions 54 (contacts 64, 66, 68) are primarily designed for interaction with a snap-action disc 70. The contacts 65, 67 (second contact regions 55) are primarily used for electrical connection to a Hall sensor 38. The electrical connections between the individual contacts 64, 66, 68 are routed via the interconnects of the punched grid to terminal contacts 69, from where a simple transition to a cable arrangement 31 can be achieved. Since the first contact regions 54 are routed to the terminal contacts 69 in electrical isolation from the second contact regions 55, the signals from the first contact region 54 or from the first detection device 26 and the signals from the second contact region 55 or from the second detection apparatus 36 can be processed separately. It should be pointed out that the punched grid does not have to extend in one plane. Rather, as FIG. 1 shows, it is also possible for the punched grid to extend in three dimensions.

Figure 3:
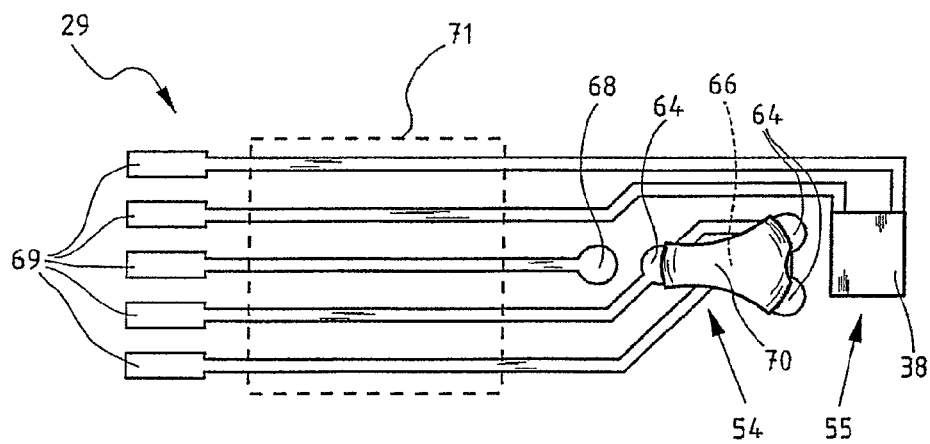
FIG. 3 shows the conductor arrangement shown in FIG. 2 when it has been fitted with a snap-action disc and a Hall sensor.

FIG. 3 shows an exemplary embodiment of the conductor arrangement 29 shown in FIG. 2 when it has been fitted with a snap-action disc 70 and a Hall sensor 38. In this case, the Hall sensor 38 can output either a digital value "0" or "1" or a measured value, which is evaluated in the control device 30.

In the depressed state, the snap-action disc 70 makes an electrical connection between the contacts 64 and 66. This corresponds to the situation in which the belt tongue 16 has been inserted. In the exemplary embodiment shown here, the snap-action disc 70 is used to actuate a belt-wear comfort coil, and the Hall sensor 38 is used to send a signal to the airbag controller.

In addition, the region 71 enclosed by dashes is meant to indicate that instead of the straight profile of the conductor arrangement 29 shown in FIG. 2 it is also possible to have other shapes and that electronic components, particularly SMD components, can be arranged between the conductors in the conductor arrangement 29. In this regard, reference is also made by way of example to FIG. 7.

Figure 4:
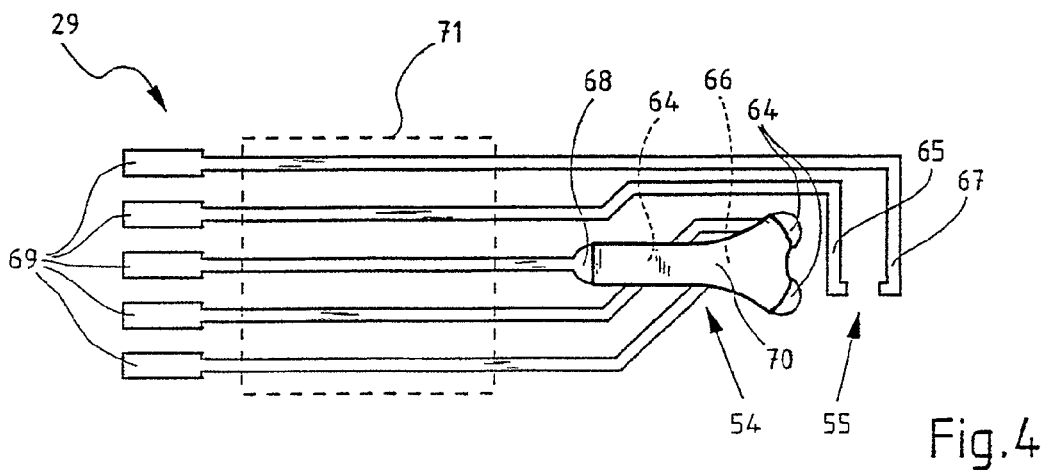
FIG. 4 shows the conductor arrangement shown in FIG. 2, the first contact regions having been fitted with a snap-action disc which is in the form of a break contact/make contact combination.

FIG. 4 shows another component-fitting option for the conductor arrangement 29. In the case of the embodiment shown here, a snap-action disc 70 with a third contact section 76 is used. In the relaxed state, the snap-action disc 70 makes an electrical connection between the contacts 64 and 68, while the contacts 64 and 66 remain in electrical isolation. When the snap-action disc 70 is depressed, the connection between the contacts 64 and 68 is broken, while an electrical connection is produced between the contacts 64 and 66. In this example, the break contact formed by the third contact section 76 is used to actuate an indicator lamp in the dashboard. The make contact formed by the second contact section 74 sends a signal to the airbag controller.

A multiplicity of component-fitting options arise, with appropriate refinement of the contact regions 54, 55 also allowing different types of detection devices to be used.

FIGS. 5 to 8 show another embodiment of an inventive buckle switching device 24' in a buckle 10'.

The design and operation of the buckle 10' generally correspond to those of the buckle 10 in FIG. 1. Only differences are explained below.

Figure 5:
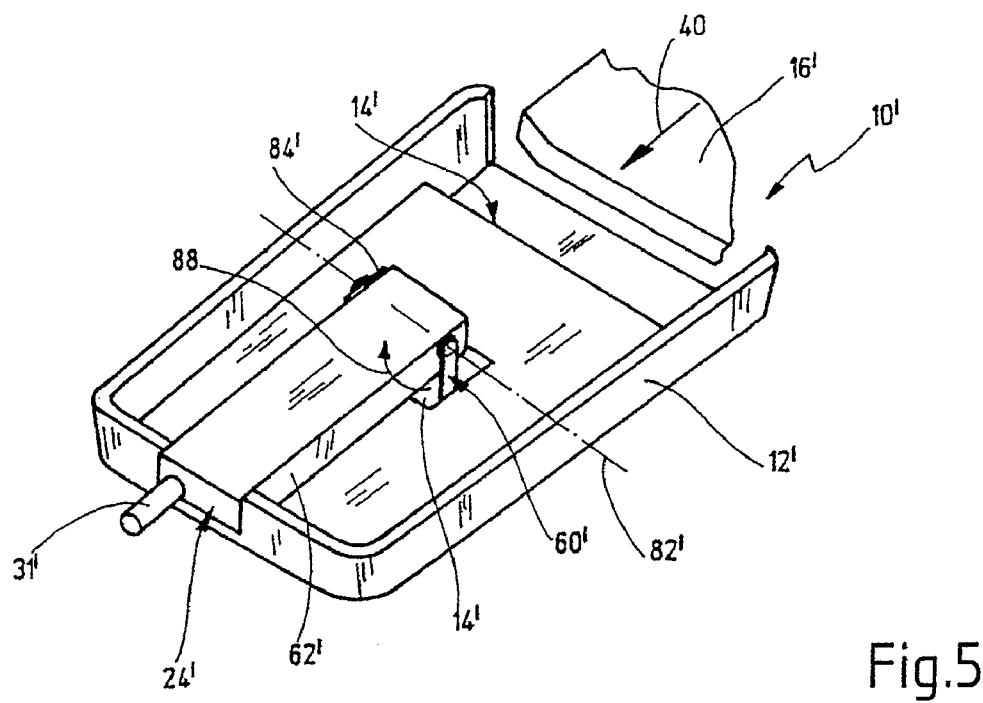
FIG. 5 shows a schematic perspective view of a buckle based on a further embodiment of the invention in the open state.

FIG. 5 shows that the buckle switching devices 24' are accommodated in a housing section 62' which can be fixed in the housing 12' of the buckle 10'. In this case, a lever on the operating element 60 protrudes from the housing section 62'. When the belt tongue 16' is introduced, the operating element 60 is deflected, as shown at 88.

Also arranged on the outside of the housing section 62' is schematically illustrated an elastic restoring element 84'. The elastic restoring element 84' is used to return the operating element 60 to its initial position as soon as the belt tongue 16' has been removed from the buckle 10'.

Figure 6:
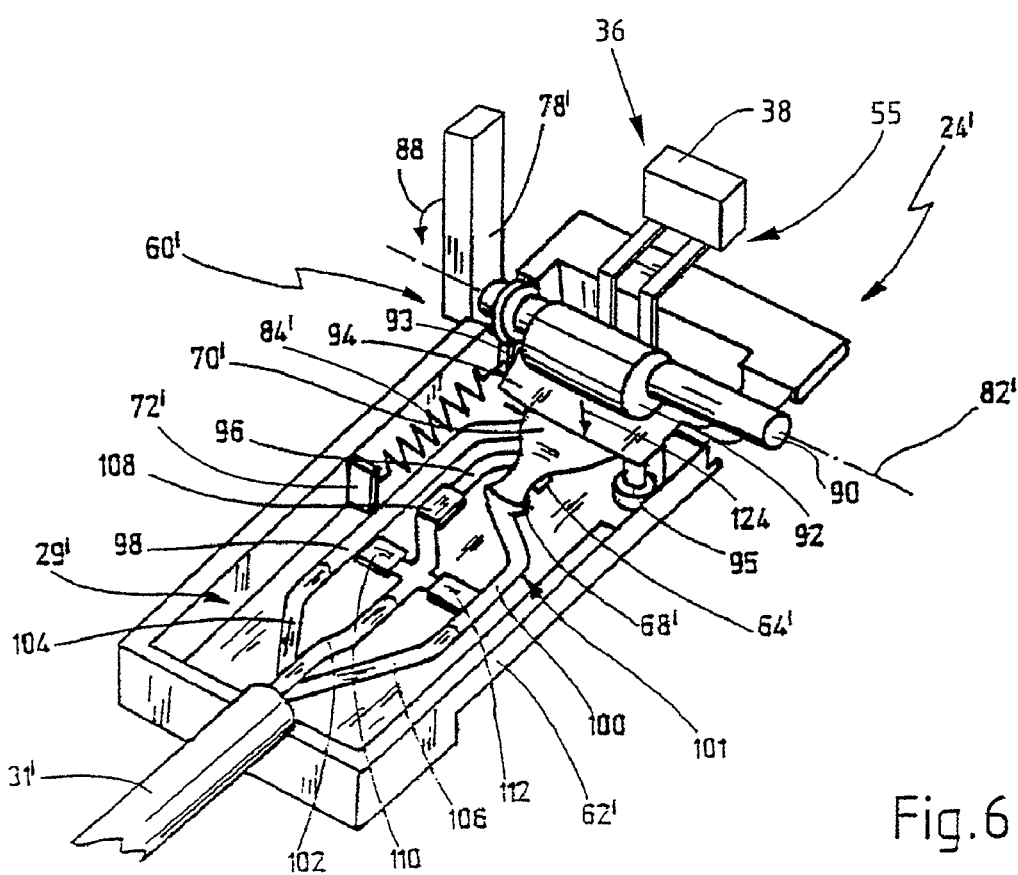
FIG. 6 shows a schematic perspective view of buckle switching devices for the buckle in FIG. 5.

The design of the buckle switching device 24' is shown in more detail in FIG. 6, which primarily explains the first detection device 26. The second contact region 55 and the Hall sensor 38 are situated in the insertion region of the belt tongue 16.

The operating element 60' has a rotation shaft 90 which is mounted so as to be able to rotate about a rotation axis 82'. Both ends of the rotation shaft 90 extend out of the housing section 62'. At one end, the rotation shaft 90 has a lever mounted on it in the form of a leg or piece 78'. This piece 78' can also be seen in FIG. 5 and is deflected by the belt tongue 16.

In its central section, the rotation shaft 90 has an eccentric element 92 which is used to operate the snap-action disc 70'.

The elastic restoring element 84 is formed by a spring 84' which is mounted on the housing 62' and acts upon a lever 93 connected to the rotation shaft 90 so as to rotate with it. The other end of the spring 84' is fixed on a housing section 72'. The mechanical operating device 27 is thereby prestressed into the first actuation position, i.e. the eccentric element 92 is withdrawn and liberates the snap-action disc 70'.

Arranged between the eccentric element 92 and the snap-action disc 70' is a pressure plate 94. The pressure plate 94 is mounted so as to be displaceable in the operating direction (actuation direction) of the snap-action disc 70' by means of suitable bearings 95 (one of which is shown in FIG. 6). The pressure plate 94 ensures that the transverse component exerted by the eccentric element 92 is not transmitted to the snap-action disc 70'. In other words, the snap-action disc 70' is operated merely in its operating direction, which is shown by an arrow 124 in FIGS. 6 and 8.

In the buckle switching device 24', the conductor arrangement 29' is formed by a punched grid arrangement 101 which has a first conductor 96, a second conductor 98 and a third conductor 100.

Figure 7:
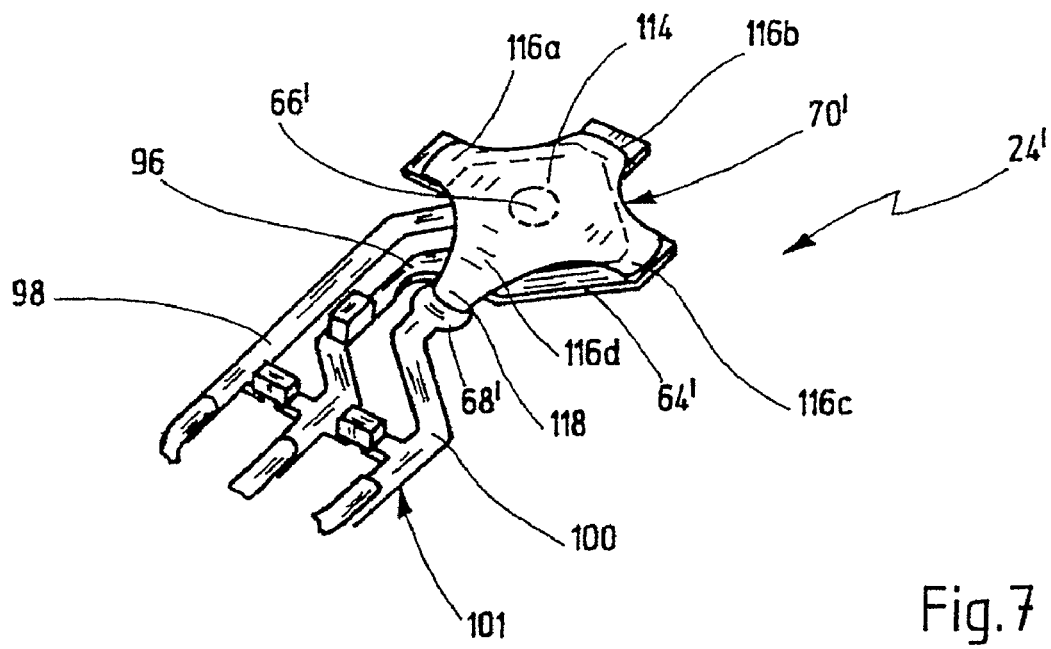
FIG. 7 shows a schematic perspective detail view of the buckle switching device in FIG. 6.
Figure 8:
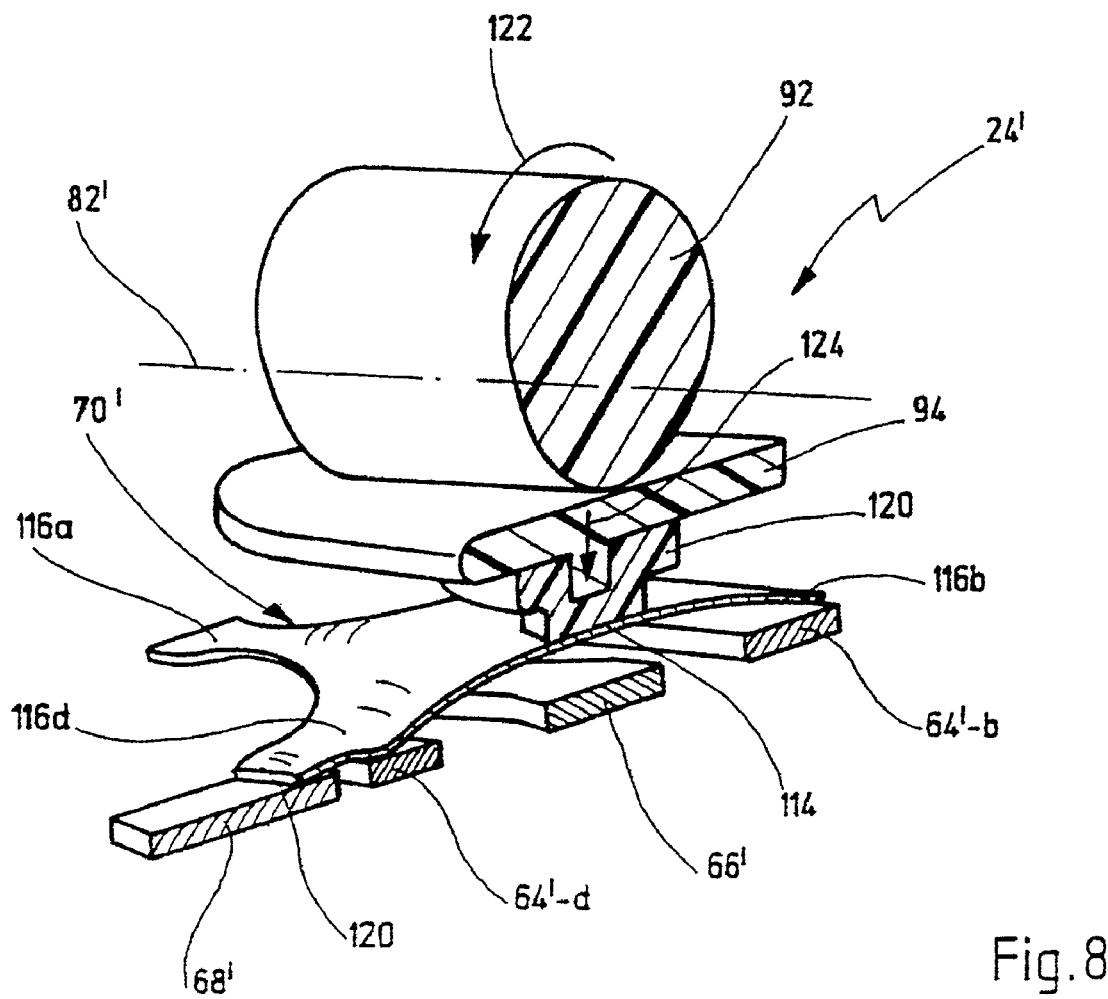
FIG. 8 shows a schematic enlarged sectional view through the buckle switching devices in FIGS. 6 and 7.

As FIGS. 6, 7 and 8 show, the first conductor 96 is connected to the first electrical contact 64'. To be more precise, the end of the first conductor 96 forms the first electrical contact 64'.

The end of the second conductor 98 which is below the snap-action disc 70' forms the second electrical contact 66'.

The end of the third conductor 100 forms the third electrical contact 68'.

The three conductors 96, 98, 100 are connected to a cable arrangement 31' via an electrical measurement circuit 28'. The cable arrangement 31' has three wires 102, 104, 106.

The first lead 102 is connected to the first conductor 96. The second lead 104 is connected to the second conductor 98. The third lead 106 is connected to the third conductor 100.

The connection can be made by crimping, by welding or by similar means, for example. Alternatively, it is also possible for the conductors 96, 98, 100 to have female-connector sections welded or otherwise attached to them which protrude from the housing section 62' and can be inserted into the relevant terminal pins of the cable arrangement 31'.

The electrical measurement circuit 28 is formed by three resistors 108, 110, 112.

The first resistor 108 is arranged in the first conductor 96, that is to say between the first electrical contact 64' and the first lead 102. The second electrical resistor 110 is arranged between the first conductor 96 and the second conductor 98, that is to say between the two leads 102, 104. Correspondingly, the third electrical resistor 112 is arranged between the two conductors 96 and 100, that is to say between the leads 102, 106.

The control device 30 (not shown in FIG. 6) can apply a quiescent current or a quiescent voltage to the leads 102, 104, 106. On account of the resistors 108, 110, 112, only a very small quiescent current flows (for example in the range <10 mA, preferably <5 mA, in particular <2 mA) which does not stress the vehicle battery. In the event of a short between the conductors 96, 98, 100, the current would rise severely, which can be identified by the control device 30. In this case, the applied voltage can be interrupted and an error message or error indicator can be output.

As shown by FIG. 7, in particular, the snap-action disc 70 has a central section 114 from which four legs 116a, 116b, 116c, 116d extend. In this case, the central section 114 forms the second contact section 74.

The electrical contact 64' extends below the legs 116a, 116b, 116c, 116d, so that the legs 116 all form the first electrical contact 64'.

One leg 116d is provided with an extension section 118 which corresponds to the third contact section 76. The extension section 118 is in contact with the third electrical contact 68' in the state of rest.

As can be seen in FIG. 8, in particular, the eccentric element 92 and the snap-action disc 70 have the pressure plate 94 arranged between them. Fixed to the underside of the pressure plate 94 is a pressure piece made of an elastic material which bears directly against the top of the snap-action disc 70.

Forces exerted by the pressure plate 94 are therefore attenuated by the pressure piece 120. In addition, the friction on the top of the snap-action disc 70' is reduced. Overall, the arrangement shown can extend the life of the snap-action disc 70'.

FIG. 8 also shows that the leg 116b is situated above a section 64'-b of the first electrical contact 64 and is constantly in contact with it. Accordingly, the leg 116d is in constant contact with a section 64'-d of the first electrical contact 64'.

FIG. 8 also shows, at 122, a rotation of the rotation shaft 92 as initiated on the basis of a movement 88 by the piece 78'. This moves the pressure plate 94 down-wards perpendicular to the snap-action disc 70', as shown schematically at 124.

Figure 9:
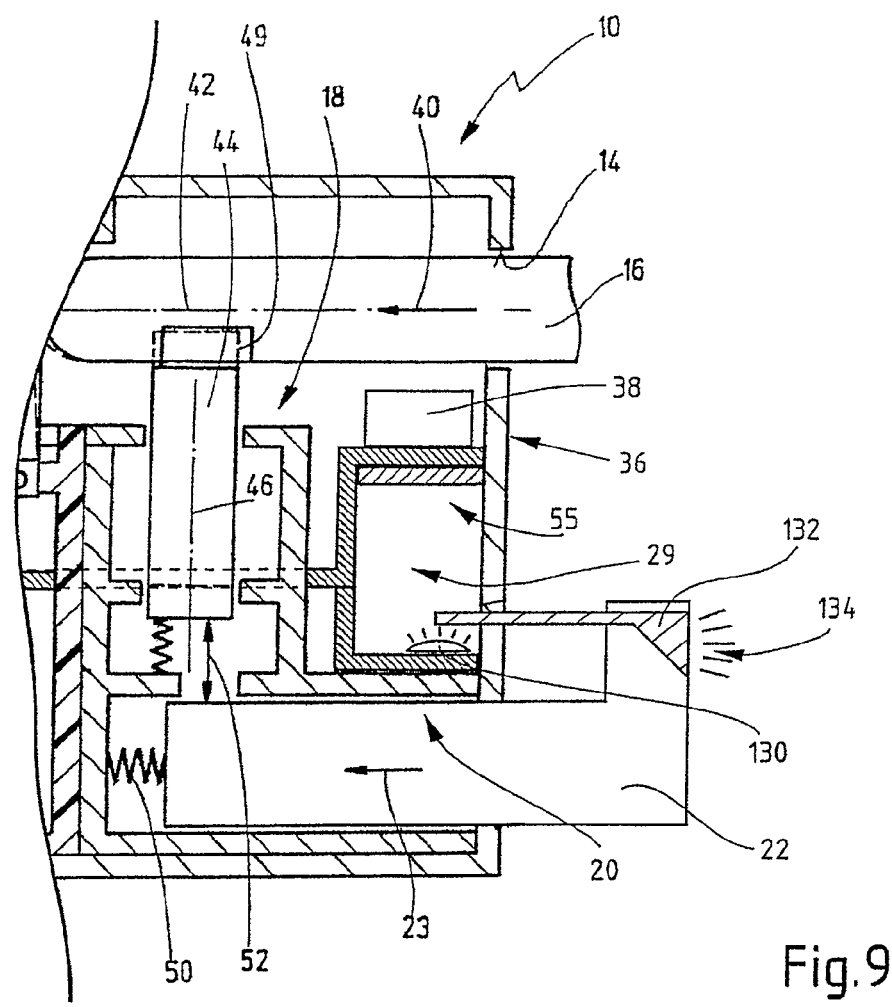
FIG. 9 shows a detail from the embodiment shown in FIG. 1 with a lamp element.

FIG. 9 shows a detail from the embodiment shown in FIG. 1 with a lamp element 130, only the differences in relation to FIG. 1 being discussed.

The conductor arrangement 29 comprises a further region which contains the lamp element 130. This is preferably a light-emitting diode, particularly in the form of an SMD component. The lamp element 130 has an associated light guide 132, one of whose ends is situated in the button 22. The light guide 122 may be of simple design, for example a plastic part, particularly made of two-component injection moulding. It mainly needs to have the property of guiding the injected light onwards.

At least some of the light emitted by the lamp element 130, said light being symbolized by five short lines, enters the light guide 132 and is guided by means of internal reflections to an emission region 134, where the light is emitted (symbolized by five longer lines). Since some of the button 22 is thus now eliminated, a user can easily find the buckle 10 and/or the opening for the belt tongue 16 even in the dark.

It is also possible to extend the conductor arrangement 29 or to provide it with a protruding element. The lamp element 130 can then be positioned close to the emission region 124, so that the light guide 132 can be dispensed with.

Figure 10:
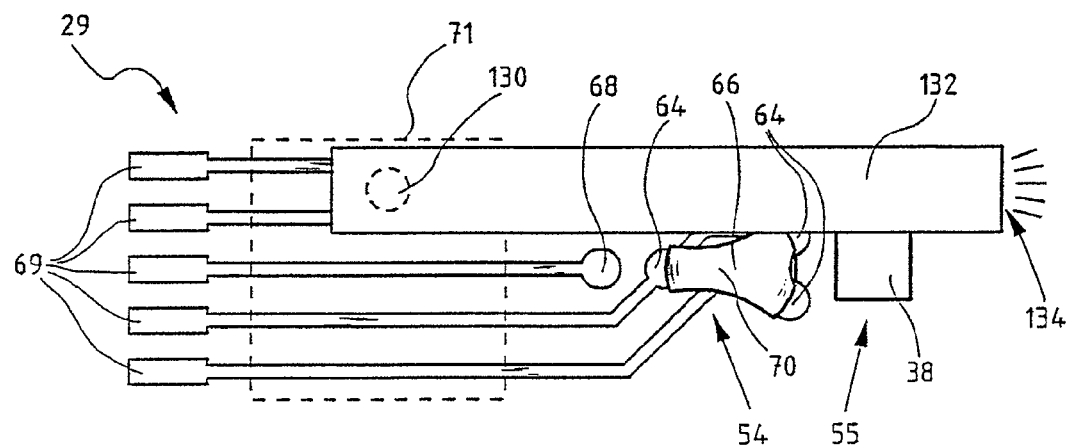
FIG. 10 shows an embodiment as shown in FIG. 3 with a lamp element.

FIG. 10 shows the exemplary embodiment from FIG. 3, with a lamp element 130 and a light guide 132 now additionally being arranged. This example reveals that it is also possible to arrange the lamp element 130 in the region 71 and to guide the emitted light through an extended light guide 132, for example to the button 22.

It is also possible to use the conductors in the conductor arrangement 29 for the Hall sensor 38 for operating the lamp element 130 too or else to arrange the lamp element 130 on the second contact region 55, in this case possibly also instead of the Hall sensor 38.

The buckle switching devices 24' are preferably manufactured as follows:

First of all, the punched grid is manufactured and is coated with the housing section 62'. This gives the punched grid 101 the necessary stability. Before the coating, the punched grid may be in a form such that the conductors 96, 98, 100 are connected to one another. Following the coating, connecting bars can be punched out in order to achieve the electrical insulation for the conductors 96, 98, 100. Next, the resistors can be soldered or welded on. The leads 102, 104, 106 can also be welded on. The coated punched grid has the electrical contacts 64', 66', 68' exposed. The snap-action disc 70' is inserted and is sealed using a sealing element. The part produced in this way is a top part of the buckle switching device 24'.

To produce the corresponding bottom part, the rotation shaft 90 with the eccentric element 92 and the lever 93 is inserted into a plastic moulding (housing section 62'). The spring 84' and the pressure plate 94 are then inserted. This completes the bottom part for operating the snap-action disc 70'.

Finally, the top part and the bottom part are connected to one another, in particular are clipped used a clip fastening, cables are welded on the terminal contacts 69 and finally are coated.

In this way, the buckle switching device 24' can be completely sealed. In particular, it is possible to achieve sealing in accordance with the IP65 standard, so that extraneous liquids (cola, coffee etc.) cannot influence the operation of the buckle switching device 24'. This represents a particular advantage over known apparatuses.

The invention claimed is:

1. A buckle switching device for a buckle for safety belts for electrically detecting whether a belt tongue is locked in the buckle, where the buckle switching device is at least partly enveloped by a housing of the buckle, and the buckle switching device comprising a conductor arrangement and a first detection device which is influenced by means of the belt tongue for electrically detecting whether the belt tongue is locked, the buckle switching device having a second detection device, wherein the conductor arrangement has first contact regions for an electrical connection to the first detection device and second contact regions for an electrical connection to the second detection device which is capable of being influenced by means of the belt tongue, wherein one of the detection devices has an electrically conductive snap-action disc which is moved by a mechanical operating device from a first to a second actuation position, which closes or opens an electrical contact.

2. The buckle switching device according to claim 1, wherein the first detection device is connected in parallel with the second detection device.

3. The buckle switching device according to claim 1, wherein the first detection device is connected in series with the second detection device.

4. The buckle switching device according to claim 1, wherein the snap-action disc has a first contact section, which is in contact with a first electrical contact both in the first and in the second actuation position, and a second contact section, which is spaced apart from a second electrical contact in a first actuation position and which is in contact with the second electrical contact in the second actuation position.

5. The buckle switching device according to claim 1, wherein the mechanical operating device transmits a force exerted on the belt tongue to the snap-action disc when the belt tongue is inserted.

6. The buckle switching device according to claim 1, wherein the snap-action disc has a third contact section which is in contact with a third electrical contact in a first actuation position and which is spaced apart from the third electrical contact in the second actuation position.

7. The buckle switching device according to claim 1, wherein one of the detection devices has a Hall sensor.

8. The buckle switching device according to claim 1, wherein the conductor arrangement is a punched grid.

9. The buckle switching device according to claim 1, wherein the mechanical operating device has an operating element in the form of an eccentric element which is rotated about a rotation axis by means of a force exerted by the belt tongue and has an eccentric section which acts on the snap-action disc.

10. The buckle switching device according to claim 1, wherein the mechanical operating device has a rotation shaft which is mounted on the housing so as to be able to rotate about a rotation axis and is connected to a lever which extends into an opening for inserting the belt tongue.

11. The buckle switching device according to claim 1, wherein the mechanical operating device has a rotation shaft which is mounted on a housing so as to be able to rotate about a rotation axis and is connected to an elastic restoring element which elastically prestress the rotation shaft into the first actuation position.

12. The buckle switching device according to claim 11, wherein the elastic restoring element is formed by a spring which is mounted on the housing and acts upon a lever which is connected rotationally locked to the rotation shaft.

13. The buckle switching device according to claim 1, wherein a lamp element is electrically connected to the conductor arrangement.

14. The buckle switching device according to claim 13, wherein the lamp element has an associated light guide in order to pick up at least some of the light emitted by the lamp element and to guide it to a desired location.

15. The buckle switching device according to claim 14, wherein the light guide is in a form such that the light is guided to a button which is designed to unlock the buckle.

16. A buckle switching device for a buckle for safety belts for electrically detecting whether a belt tongue is locked in the buckle, where the buckle switching device is at least partly enveloped by a housing of the buckle, and the buckle switching device has a conductor arrangement and a first detection device which is influenced by means of the belt tongue for electrically detecting whether the belt tongue is locked, the buckle switching device having a second detection device, wherein the conductor arrangement has first contact regions for an electrical connection to the first detection device and second contact regions for an electrical connection to the second detection device which is influenced by means of the belt tongue, wherein the conductor arrangement is a punched grid.

* * * * *